United States Patent [19]
Ruhl et al.

[11] 3,979,084
[45] Sept. 7, 1976

[54] APPARATUS FOR LEVEL WINDING TUBING

[75] Inventors: Robert C. Ruhl, Cleveland Heights, Ohio; James E. Johnson, Southfield, Mich.

[73] Assignee: Chase Brass and Copper Co., Inc., Cleveland, Ohio ; by said Robert C. Ruhl

[22] Filed: May 1, 1975

[21] Appl. No.: 573,761

[52] U.S. Cl. .................... 242/158 F; 242/158.4 R
[51] Int. Cl.[2] ........................................ B65H 57/28
[58] Field of Search ......... 242/158 R, 158 F, 158.2, 242/158.4 R

[56] References Cited
UNITED STATES PATENTS

| | | | |
|---|---|---|---|
| 3,109,606 | 11/1963 | Kubilos............................. | 242/158 F |
| 3,820,729 | 6/1974 | Springer et al.................. | 242/158 R X |
| 3,822,831 | 7/1974 | Marcum........................... | 242/158 R X |

Primary Examiner—Charles E. Phillips
Attorney, Agent, or Firm—John L. Sniado; Walter Kruger

[57] ABSTRACT

Level winding is accomplished by rotating a reel with sufficient torque to wind material on the reel while traversing the reel a predetermined precise fractional part of the width of the material wound for each increment of revolution of the reel so that the reel is traversed precisely the width of the material wound plus a precise space between adjacent turns, if desired, during each revolution of the reel. Pulses indicative of the extent of rotation of the reel are transformed, by dividing, into pulses indicative of both the extent of rotation of the reel and the desired distance between centers of adjacent turns of the material wound onto the reel. The pulses rotate a first synchrotransducer electrically connected to a second synchrotransducer which is driven in response to traverse of the reel. An error signal resulting from any non-synchronism of the synchrotransducers is used to operate a servo-valve which changes the rate of traverse in a direction to reduce the error signal.

6 Claims, 2 Drawing Figures

APPARATUS FOR LEVEL WINDING TUBING

BACKGROUND OF THE INVENTION

This invention relates to an apparatus for accurately winding tubing into a coil of predetermined length having substantially flat ends and with the tubing wound helically in successive layers.

More specifically, the invention relates to a unique control system for level winding a coil in which the wound coil has the turns of all of its layers in closely adjacent relation to each other.

In the manufacture of tubing, such as copper tubing, the tubing is wound helically into multilayer reels or coils usually containing a predetermined length of the tubing. Prior attempts to form a very accurately wound helical pattern of tubing in each of the layers of the coil, especially where the winding is done at high speeds have not been successful because the traversing mechanism could not accurately level wind the tubing, especially where different diameters of tubing were to be wound at different times by the same traverse mechanism. While some types of mechanical traverse mechanisms will work acceptably for tubing of one diameter, they cannot accommodate different diameters. Previous traverse control mechanisms which do have variable-diameter capability become progressively less accurate as winding speed or line speed is increased.

The problems of inaccurate level winding are that excessive space between layers will allow tubing on the next layer to wedge between the turns on the lower layer. Hence, the tubing plastically deforms from its desired circular shape. Also, such wedging can lead to jerky behavior of the coil when subsequently being unwound into automatic fabrication machines.

Too little traverse will cause the tubing to "pile up" on the reel, thereby leading to kinking when a turn suddenly is bent over the small radius of an improperly laid lower turn.

Moreover, inaccurately wound coils are more vulnerable to damage from handling, as the turns do not have the maximum surrounding support from adjacent turns. They are also more vulnerable to unwanted deformation of some of the turns during subsequent annealing of the coil in a furnace.

SUMMARY OF THE INVENTION

In accordance with this invention, tubing or other material of uniform width is wound into coils of a predetermined length or height containing either a predetermined amount of the wound material or until the winding is concluded for any other reason. In the case of tubing and similar bendable material (including traverse wound strip and flat wire), the winding is accomplished by a current regulated DC motor which exerts sufficient torque to bend the material around the reel as the reel is rotated to wind the tubing onto the reel. Preferably, a suitable length measuring device measures the length of the material wound on the reel, and when a predetermined length is coiled, indicating that the coil is full, the mechanism stops to permit removal of the full coil. When the mechanism stops, the tubing is cut from the source of supply, the reel is traversed to a suitable position to permit removal of the coil, and the reel is then returned to a start position where the end of the tubing is again connected to the reel and winding is resumed to form the next coil.

Level winding, in accordance with this invention, is controlled by a hybrid digital and analog control arrangement which causes traverse of the winding reel to occur such that for each complete revolution of the reel, the extent of traverse is precisely equal to the diameter of the tubing which is wound on the reel, plus a desired small space. This is accomplished by generating a pulse for each increment of rotation of the reel so that each pulse is indicative of an increment of rotation of the reel, transforming the pulses by dividing or multiplying, into pulses, indicative of the extent of rotation of the reel and the diameter of tubing wound on the reel, generating an electrical signal indicative of the error in the desired traverse position of the reel from its actual position, and adjusting the traverse position of the reel toward synchronism with respect to the desired traverse position, when these positions are not in synchronism.

Further, in accordance with the invention, the wound coil has substantially flat ends. This is optimized by winding approximately two successive turns of material such as tubing one on top of the other at each end of the coil to form the transition between an inner layer and the next outer layer. This permits winding a coil of a predetermined width with substantially flat ends.

The additional convolution or wrap (which may be slightly more or less than one turn) at each end is provided for by a presetable digital counter control which is preset to stop the traverse at each end when a certain pulse count, indicative of the extent of traverse of the reel from a starting point, is reached. The reel continues to rotate, but without traversing, until a second counter indicative of an additional desired rotation of the reel is attained. In response to the completion of this second count, traverse is again initiated but in a direction opposite to the direction of the previous traverse. This cycle of winding and traverse continues from right to left, and left to right until the required length of tubing is would on the reel or the winding is stopped for other external reasons. The last layer of tubing can terminate anywhere between the ends of the reel when the predetermined length of tubing is wound. To remove the coil it is necessary to first traverse the reel to an outer unloading position and after the coil is unloaded, it is necessary to traverse the reel to an inner start position. In accordance with the invention such traversing is accomplished by selectively feeding pulses to the controls so the traverse mechanism moves as if the reel were still rotating. By such selective feeding of the pulses, synchronism of the various counters and controls of the apparatus is maintained.

In accordance with the invention, the electro-hydraulic servo-system includes an error signal generating device in the form of a synchro-transmitter synchro-transformer arrangement. A stepping motor driven by the divided pulses is connected to the synchro-transmitter by a change speed gearbox so that an error signal of the desired characteristics is obtained. The error signal from the synchro-transformer is demodulated by a demodulator, the signal is filtered by a notch filter to remove high frequency components and a lead network to enhance dynamic performance of the system, prior to feeding the signal to a servo-amplifier which is operated in an integrating mode and which advantageously has an adjustable gain control. These circuit components of the system are believed to contribute to the good steady state and dynamic accuracy of this system.

Adjustment of the level wind arrangement to wind coils of different width, and to vary the extent of dwell is easily accomplished in accordance with the invention by using counters each of which is presetable to preset the count at which traverse ceases and dwell begins and ends. In addition, the pulse divider is also of the presetable type so that change over from winding one diameter of tubing to a different diameter of tubing is quickly and easily accomplished.

The foregoing advantages are attained, by driving the reel at a sufficient torque to wind the tubing onto the reel, traversing the reel with a hydraulically driven double rod end power cylinder controlled by a closely-coupled servo-valve, generating a plurality of pulses each indicative of a predetermined rotational displacement of the reel, dividing the pulses by a predetermined number indicative of the diameter of the tubing wound, driving a desired position transducer in response to the divided pulses, driving a traverse position transducer in response to the extent of actual traverse of the reel, obtaining an error signal corresponding to the sign and magnitude of any error between the desired and actual position, and adjusting the traverse toward positional synchronism with respect to the desired position of the reel by changing the position of the servo-valve. Advantageously, the position of the servo-valve is changed at a rate dependent on the magnitude of the error in position and the system is tuned to give maximum dynamic and steady-state performance and accuracy without instability or oscillation.

Additional advantages are obtained by: (a) dividing the pulses by a presetable divider which can easily be preset to divide by a desired number so change over to wind tubing of a different diameter is easily accomplished; (b) counting pulses in a reel width counter which is presetable to permit easily changing the width of a wound coil; and (c) counting dwell pulses in a presetable dwell counter so that the extent of dwell can easily be changed.

Numerous other advantages and features of the invention will become apparent from the accompanying drawings and detailed description.

DETAILED DESCRIPTION OF PREFERRED EMBODIMENT

Figure 1:
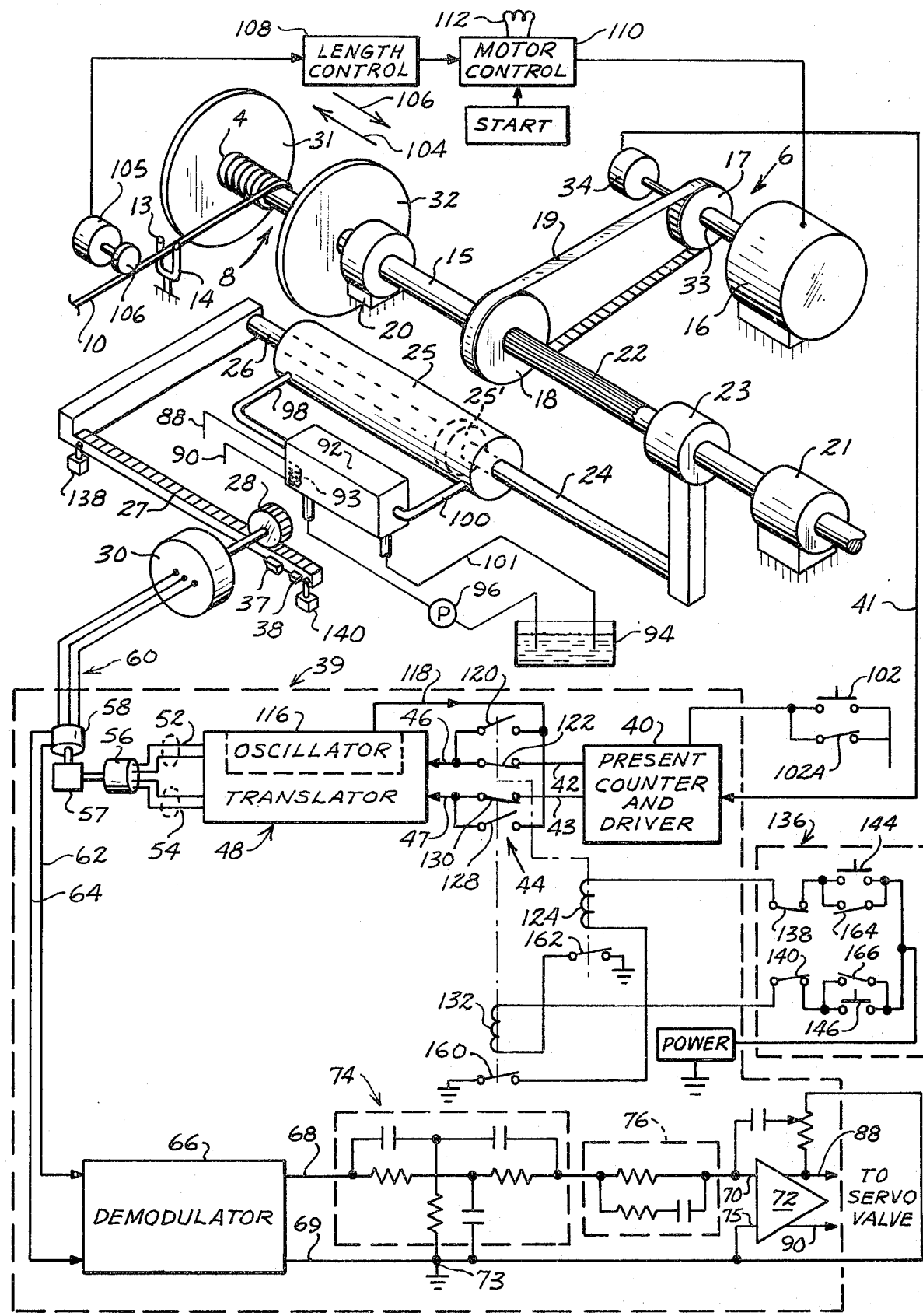
FIG. 1 is a view partly in schematic, showing a level wind control arrangement according to this invention.

Referring now to the drawings, and particularly to FIG. 1, there is shown a level wind system 6 in accordance with this invention and with which the method of the invention is practiced. System 6 includes a reel or spool 8 onto which tubing 10 from, for example, a tubing inspection device (not shown) is wound onto reel 8. The tubing passes through guide rollers 13 of a fixed guide 14 to the reel 8. The reel 8 is rotated and is traversed relative to guide 14 to level wind the tubing on the reel.

Tubing 10 can be copper or aluminum tubing which is frequently packaged in coils of a predetermined length, for example, 2000 feet. For handling, further processing, packing and shipping it is desirable that the coil have substantially flat parallel ends, that the convolutions of each layer be closely adjacent to each other, and that the successive layers lie so that a tight package can be formed.

Reel 8 is secured to an axially movable support shaft 15 which is rotated by a drive motor 16 via sprockets 17 and 18 and a chain 19. Shaft 15 is supported in radial bearings 20 and 21 which permit the shaft to move axially. Sprocket 18 is connected to shaft 15 via a splined section 22 of the shaft which permits the shaft to move axially with respect to the sprocket while the shaft is driven by motor 16. A thrust bearing assembly 23 is coupled to shaft 15 and provides for shifting the 23 axially in either direction while the shaft is rotating. Thrust bearing 23 is secured to a piston rod 24 at one end of a double acting hydraulic cylinder 25 which has its cylinder or body secured against movement.

Hydraulic cylinder 25 is of the double rod type, having a rod 26 at its other end which is secured to a gear toothed rack 27 so that the rack is moved when the cylinder is driven by hydraulic fluid. In mesh with rack 27 is a pinion gear 28 secured to the shaft of a synchro-transmitter 30. Pinion gear 28 is advantageously of the anti-backlash type.

Motor 16 is operated to exert at least a predetermined tension on tubing 10 to bend the tubing around the reel during the winding operation. The motor torque, while sufficient to cause the tubing to bend and wind onto reel 8, is, of course, less than that which will cause excessive flattening of the tubing. Motor 16 is advantageously operated at a substantially constant current so the tension in the tubing decreases only slightly as the size of the tubing coil wound on the reel increases in diameter. Alternatively, the current may be caused to vary in a predetermined manner. In either case, the current control should provide extra current during acceleration.

During winding, hydraulic cylinder 25 is precisely controlled with respect to the rotation of reel 8 so the wound coil 4 has its successive convolutions of tubing in closely adjacent relation to each other and with approximately a double wrap forming the transition from one layer to the immediately adjacent next outer layer. Hence, cylinder 25 traverses reel 8 a precise predetermined distance for each revolution of the reel, and when either end 31 or 32 of the reel is reached, the reel makes one (or a selectable amount near 1.0) additional revolution before starting to traverse in the opposite direction.

Figure 2:
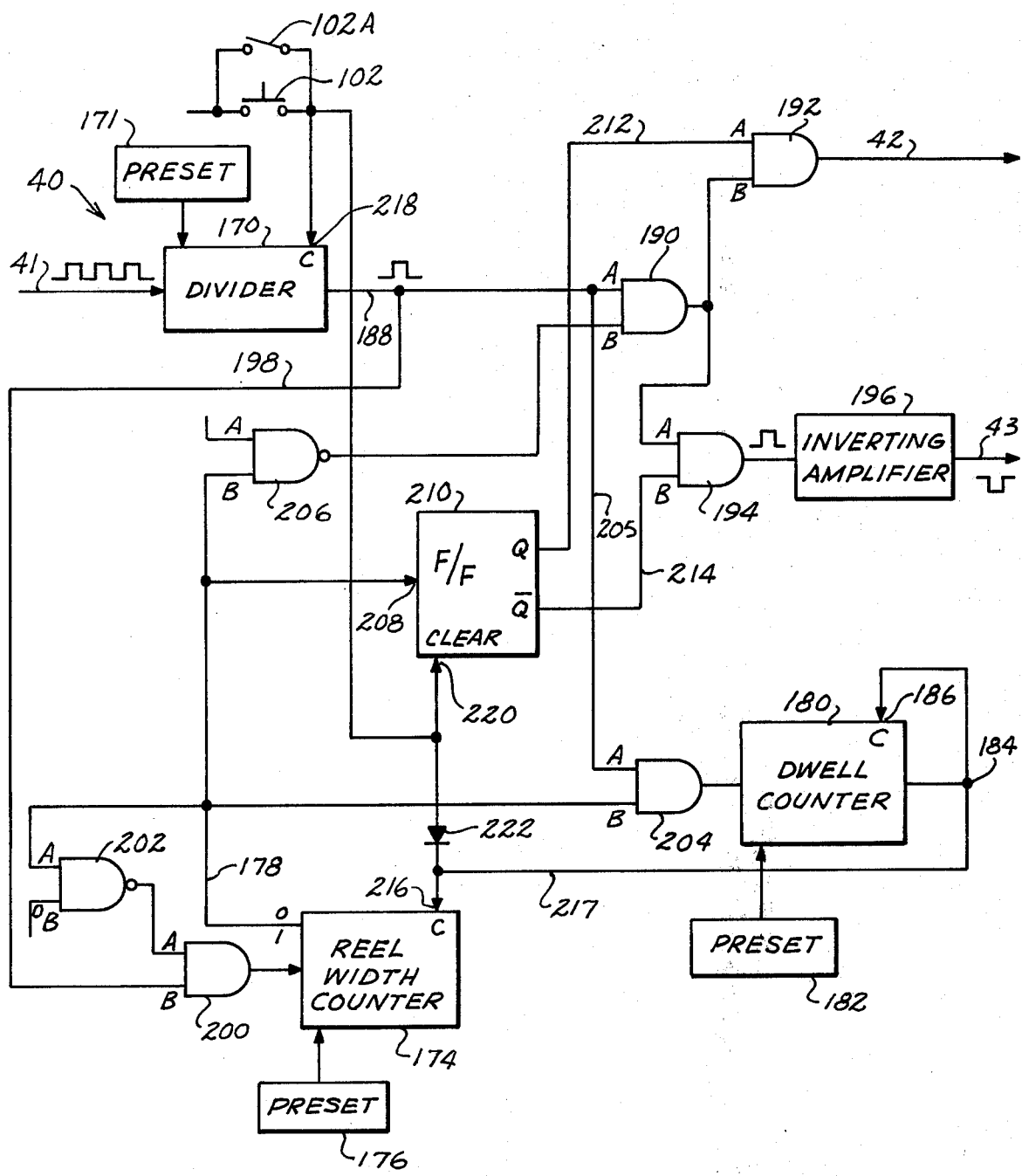
FIG. 2 is a circuit diagram of a Preset Counter and Divider of the Control of FIG. 1.

The various controls shown at FIGS. 1 and 2 control the flow of hydraulic fluid to cylinder 25 in response to the extent of rotation of reel 8 so that the tubing is precisely wrapped to form the desired coil with successive convolutions in close side by side relation to each other.

Connected to motor shaft 33 is a pulse generator 34 which generates a square wave pulse for each predetermined increment of rotation of the motor shaft. Because of the positive chain drive between motor 16 and shaft 15, the pulse generator correspondingly generates a pulse for each preselected increment of rotation of shaft 15. The numer of pulses generated by pulse generator 26 is preferably large, for example 1000 per reel shaft revolution, so a pulse is generated for each 0.36° angular displacement of reel shaft 15.

Mounted on rack assembly 27 are adjustable switch actuating stops 37 and 38 which actuate extreme travel limit switches which will be described later.

Mounted in a console or cabinet are additional electrical and mechanical components 39 of the control system for the reel traverse. There is a preset counter and divider 40 which is connected to pulse generator 34 so pulses from the pulse generator are transmitted to the preset counter along cable 41. Preset counter 40 has a forward output line 42 and a reverse output line 43. Output line 42 is connected to a forward input line 46 of a translator 48, and a reverse output line 43 is connected to a reverse input line 47 of the translator. The connection includes a relay contact network 44.

The translator has forward output lines 52 and reverse output lines 54 which are connected to a stepping motor 56 which is coupled to a gearbox speed-changer 57 which rotates a synchro-transformer 58. Synchro-transformer 58 is electrically connected to synchro-transmitter 30 by the wires of cable 60. Output lines 62 and 64 from synchro-transformer 58 are connected to a phase-sensitive demodulator 66. Output line 68 of demodulator 66 is connected to the summing junction input terminal 70 of an integrating servo-amplifier 72 via a notch filter 74 and a lead network 76. Output line 69 of demodulator 66 connects to junction 73, and then to input 75 of amplifier 72.

The output signal from servo-amplifier 72 appears on lines 88 and 90 which are connected to the torque motor windings 93 of a servo-valve 92. Servo-valve 92 is connected to one end of cylinder 25 by a flow line 98 and is connected to the other end of cylinder 25 by a flow line 100. These lines 98 and 100 must be short as possible for optimum system performance. Hydraulic fluid from reservoir 94 is supplied under substantially constant pressure to the valve by pump 96, which is preferably a pressure-compensated variable-displacement pump with an accumulator located between the pump and servo-valve. Exhaust fluid from cylinder 25 returns to reservoir 94 via the servo-valve through drain line 101. Servo-valve 92 is of the type which can control the rate of as well as the direction of the flow of hydraulic fluid through the lines 98 and 100 to drive piston 25' in both directions in the cylinder 25. Cylinder 25 has both rods of equal size to obtain equal system performance and behavior in both directions.

As will subsequently be described in detail, preset counter 40 operates to divide the pulses received from pulse generator 34, by a preset number so the number of pulses on for example, forward output line 42 during forward traverse is indicative of both the extent of rotation of reel 8 from a predetermined starting point, and the diameter of the tubing which is being wound. Preset counter 40 also creates a dwell at each end of the traverse of spool 8 so that two (or a desired number near 2.0) turns of tubing are wound on the reel at each end of the traverse to form a smooth transition from one layer of tubing to the next outer layer. In addition, the preset counter functions to provide pulses on one or the other of the two output lines 42 and 43, but not on both at the same time. A reset relay contact or manual switch 102 is connected to preset counter 40 to permit automatically or manually resetting the counter to a start position.

For purposes of explanation, traverse of the reel in the direction of arrow 104 is designated "forward", and clockwise rotation of the stepping motor is designated "reverse".

During forward traverse of reel 8 pulses from preset counter and divider 40 appear only on forward output line 42. These pulses are transmitted to forward input line 46 of translator 48 and result in pulses on forward output lines 52. The pulses step stepping motor 56 in a forward direction a precise predetermined increment of rotation (such as 1.8°) in response to each pulse. The translator amplifies and shapes the pulses so they are compatible with the characteristics of the stepping motor. During traverse in the reverse direction of arrow 106, pulses from preset counter and divider 40 appear only on reverse output line 43, pass to reverse input line 47, and reverse output lines 54 to drive stepping motor 56 in a reverse or clockwise direction.

Stepping motor 56 drives synchro-transformer 58 through a gearbox 57. Synchro-transformer 58 is electrically connected to synchro-transmitter 30 that is driven in response to traverse of reel 8. Synchro-transformer 58 and synchro-transmitter 30 form a rotary synchro-type displacement transducer system of the type in which an error signal is produced on output lines 62 and 64 when the shafts of the respective synchro-transformer and synchro-transmitter are not in synchronism relative to each other. During system installation, the synchros are mounted so as to be in synchronism at the starting position of a coil. The error signal appearing on lines 62 and 64 is an AC signal proportional to the error and whose phase shifts 180° if the sign of the error changes. This signal is transformed by demodulator 66 into a DC voltage of a polarity dependent on the direction and a magnitude dependent on the extent of the phase shift signal. For purposes of explanation it will be assumed that the error voltage on output line 68 of the demodulator is negative with respect to ground line 69 when the rotational position of the synchro-transformer 58 leads the rotational position of synchro-transmitter 30 relative to a synchronized start position and that the error voltage is positive when the synchro-transmitter 30 leads the synchro-transformer 58.

The current on output lines 88 and 90 of servo-amplifier 72 decreases when the error signal at terminal 70 is positive with respect to ground, and increases when the error signal is negative.

Servo-valve 92 is of the type which opens to an extent dependent on the magnitude of the current from servo-amplifier 72 and the direction of opening is dependent on the polarity of the current. For purposes of explanation it will be assumed that when motor coils 93 are energized with a current on line 88 positive with respect to line 90, the valve will shift toward a position to increase the rate of flow of hydraulic fluid to line 100, so the speed of travel in the forward direction of arrow 104 increases, and the amount which the valve shifts will depend on the magnitude of the current. Conversely, when the polarity of current on line 88 is negative with respect to line 90 the valve moves toward a cut-off position, and if the reverse current is continued beyond the cut-off condition, where the traverse stops, valve 92 will switch over so fluid under pressure from pump 96 is directed to line 98, and line 100 is connected to drain line 101. When there is no error current from servo-amplifier 72, the valve remains in the position it attained from the previous energization. So long as synchro-transmitter 30 and synchro-transformer 58 remain in positional synchronism, there is no error signal at terminal 70 of the servo-amplifier, and correspondingly, the position of servo-valve 92 remains unchanged. If, when reel 8 is traversed in the forward direction of arrow 104, synchro-transformer 58 begins to lead synchro-transmitter 30, (indicating that the traverse is less than it should be) the phase shift sensed by demodulator 66 produces an error signal on line 68 which is negative and which causes the current on output line 88 of the servo-amplifier to increase with respect to line 90. This further opens valve 92 so the speed of traverse of piston 25′ in the direction of arrow 104 increases. Should the servo-transmitter 30 lead the servo-transformer 58 (indicating that the traverse is beyond where it should be), the phase shift on lines 62 and 64 cause demodulator 66 to generate a positive error signal on line 68 which causes the current to the motor coils 93 to decrease thereby moving servo-valve 92 toward a closed position to decrease the flow of hydraulic fluid through line 100, so the speed of traverse in the direction of arrow 104 decreases.

When reel 8 is traversed to the predetermined end of its travel in the direction of arrow 104, the traverse of the reel is stopped, but the reel makes one (or a fraction close to one) additional revolution to wind one (or nearly one) additional layer of tubing wound on the reel. The end of the traverse is determined by the count of divided pulses in the preset counter. When the count in the counter reaches the preset value, pulses are discontinued from line 42 and correspondingly, the stepping motor stops. However, the traverse continues which makes synchro-transmitter 30 lead synchro-transformer 58 so the signal from demodulator 68 becomes positive, causing the servo-amplifier 72 to emit a decreasing current, and this decreasing current very rapidly closes the valve within a small rotation of the reel so the overshoot is insignificant. Since at this time, the synchros are slightly out of phase, the output current will reverse very briefly, reversing the traverse a very small amount to bring the synchros into precise synchronization. This small trimming occurs during the very first moment of the dwell interval. During the dwell interval when the additional turn of tubing is wound on the reel at the end position of traverse, a second count of preset counter 40 determines when the additional desired rotation of the reel has taken place, by counting the divided pulses from pulse generator 34. Upon completion of the required count, the preset counter switches to a reverse mode of operation so pulses apear only on reverse line 43. During the dwell interval, synchro-transmitter 30 and synchro-transformer 58 remain in positional synchronism since the traverse is stopped and there are no driving pulses to stepping motor 56. The pulses on reverse line 43, which commence at the end of the dwell interval, are shaped by translator 48 and appear on reverse line 54 to drive stepping motor 56 in a reverse or clockwise direction. The first increment of reverse rotation of synchro-transformer 58 by the stepping motor 56 causes an error signal to appear on lines 62 and 64 which causes demodulator 66 to generate a positive error signal on output line 68. The current on line 88 of servo-amplifier 72 then becomes negative with respect to line 90 and as a result, servo-valve 92 is shifted so hydraulic fluid under pressure enters the cylinder 25 via line 98, and line 100 of cylinder 25 is connected to drain line 101, so fluid in this end of the cylinder will return to reservoir 94. Pressure fluid flowing through line 98 into the cylinder 25 causes reel 8 to traverse in the reverse direction of arrow 106. Servo-valve 92 continues to open until the fluid flowing to the rod end of the cylinder through line 98 traverses the reel to a position in which synchro-transmitter 30 is in positional synchronism with synchro-transformer 58. When the synchro-transmitter and synchro-transformer are in synchronism, there is no error signal, there is a constant current on output lines 88 and 90 of the servo-amplifier, and the valve remains in the extent of its open position. The lead network 76 functions to improve the dynamic performance of the system, as will subsequently be explained.

The length of tubing wound onto reel 8 is controlled by a length measuring device which can take the form of a pulse generator 105 having a drive wheel 106 which frictionally engages tubing 10. Pulses from pulse generator 105 are fed to length control 108, and when a predetermined count appears in a counter of the length control, motor control 110 is actuated to de-energize drive motor 16. Motor control 110 can include an indicator lamp 112 to indicate to the operator that the reel contains the required length of tubing and that the wound coil is ready for removal. The outermost layer of the coil will usually be only partly complete when the coil contains the required length of tubing, and hence, the reel will stop at a traverse position between the ends of its travel. For removal of the coil it is desirable to selectively traverse the reel to its full out or forward position, i.e., its maximum traverse in the direction of arrow 104, but without rotating reel 8. This full out position can be beyond the end of the normal traverse.

In order to maintain synchronism between synchro-transmitter 30 and synchro-transformer 58, a selective manual or relay switch traverse arrangement is provided for selectively traversing the reel without rotating the reel. This is accomplished by unique circuitry which provides pulses which cause the reel to traverse as if the reel were rotating and pulses were generated by pulse generator 26. Instead, these pulses for selective manual traverse are generated by an oscillator 116 which is conveniently mounted in translator 48. Since oscillator 116 can be of solid state construction, it advantageously oscillates continuously even when its pulses are not used. The pulses from oscillator 116 appear on output line 118 of the relay contact network 44.

Relay contact network 44 includes a normally open contact 120 and a normally closed ocontact 122 which are operated by a relay coil 124. There is a normally open contact 128 and a normally closed contact 130 operated by a relay coil 132. Relay coils 124 and 132 are controlled by control 136. Control 136 includes limit switches 138 and 140 so arranged that both switches are normally closed. When the reel is in the extreme forward position, switch 138 opens, and when the reel is in the extreme back (or start) position, switch 140 opens.

Control 136 includes a forward traverse manual control switch 144 and a reverse traverse manual control switch 146.

Control 136 also includes interlock contacts 160 and 162 and relay contacts for automatic system operation from a line master control system of the machine.

The operation of circuits 136 and 44 is as follows. Once the required length of tubing has been wound and the reel brought to a stop, the reel will most usually be in some position other than the desired forward position for coil removal. When it is desired to traverse the reel to its full forward position (whose location may be adjusted by moving limit switch 138), either the relay contact 164 is closed by the machine master control system or else the manual switch 144 is held closed. This energizes the coil 124 of relay 1CR, which opens contact 162, thus preventing coil 132 from being energized, and opens contact 122, and closes contact 120, allowing pulses from the adjustable-frequency oscillator to be fed onto line 46, thus causing the synchro 58 to be driven and the reel will traverse forward until limit switch 138 is opened by a cam 37 on the reel mounting base, which de-energizes coil 124.

The full coil can now be removed and then either manual switch 146 or relay contact 166 can be used to traverse the reel backwards in an analogous manner until switch 140 is opened by cam 38.

If either switch 144 or 146 is accidentally depressed during the level winding, this will simply cause an improperly wound coil and will not harm any of the components of the machine.

With reference to FIG. 2, preset counter and divider 40 will now be described. To facilitate explanation, the inpupts of the several AND and NAND gates of preset counter and divider 40 are designated by the letters A and B. Counter 40 includes a programmable divider 170 with a preset circuit 171 that can include suitable switches to permit manually changing the number by which the divider divides the input pulses on line 41. There is a reel width counter 174 which is of the programmable type and has a preset counter 176 to permit manually setting the extent of its count. The circuitry of reel width counter 174 is such that when the count in the counter reaches the preset number, the signal on output line 178 of the counter switches from logic 0 to logic 1.

There is also a dewll counter 180. Dwell counter 180 is programmable and the count of the counter can be programmed manually by preset 182. Dwell counter 180 is arranged to generate a reset pulse at output terminal 184 when the preset count in the counter has been reached. The reset pulse is fed back to a clear or reset terminal 186 of the counter to clear the counter when the preset count is reached.

Output line 188 of divider 170 is connected to an AND gate 190. The output of AND gate 190 is connected to AND gates 192 and 194. The output of AND gate 192 is connected to forward output line 42 and the output signals are positive pulses. AND gate 194 is connected to reverse output line 43 via an inverting amplifier 196 so pulses on line 43 are negative.

Reel width counter 174 is connected to output line 188 of divider 170 via line 198 and input B of AND gate 200. Terminal A of AND gate 200 is connected to the output of a NAND gate 202 which has its input terminal B unconnected so NAND gate 202 functions as an inverter of the signal appearing at its A input which is connected to output line 178 of reel width counter 174.

Output line 178 is also connected to input B of AND gate 204 which has its output connected to dwell counter 180. Input A of gate 204 is connected to divider output line 188, by line 205. Line 178 is also connected to input B of NAND gate 206 which has its output connected to input B of AND gate 190, NAND gate 206 functioning to invert the signal on its B input. Line 178 is also connected to input terminal 208 of flip flop 210. One output of flip flop 210 is connected to the A input of AND gate 192 via line 212, and the other output of the flip flop is connected to the B input of AND gate 194 via line 214.

Divider 170 divides the pulses appearing on input line 41 by a number so selected that the divided pulses at line 188 are the precise number to cause cylinder 25 to traverse reel 8 a distance equal to the diameter of the tubing being wound plus a small space during each complete revolution of the reel. The calibration for a family of sizes is determined by the ratio of rack 27, pinion 28, and gearbox 57. Since divider 170 can be preset to divide by different numbers, the level wind arrangement of this invention can be used to wind tubing of different diameters, merely by changing the dividing number of divider 170. The dividing number will be larger for small diameter tubing than for larger diameter tubing. Assume for purposes of explanation that the dividing number of divider 170 is the number 30 so one pulse appears on output line 188 for every 30 pulses at input line 41.

Reel width counter 174 is preset so the extent of its count before the signal on its output line 178 switches from logic 0 to logic 1 determines the width of a coil of tubing wound on the reel. The preset count in reel width counter 174 may be simply calculated for a given tubing and width.

Dwell counter 180 is preset to count a number indicative of about one complete revolution of reel 8. Since dwell counter 180 receives divided pulses from divider 170, the count of this counter will change with the dividing number of divider 170.

In its reset or initial state, reel width counter 174 has a logic 0 level on its output line 178. A logic 0 at input B of NAND gate 206 produces a logic 1 at input terminal B of AND gate 190 so AND gate 190 is enabled to pass pulses from output line 188 to AND gates 192 and 194. Flip flop 210 is in its reset state where its output signal on line 212 to input A of AND gate 192 is at a logic 1 level, and correspondingly, gate 192 is enabled to pass pulses it receives at its terminal B from AND gate 190. The output of flip flop 210 on line 214 is at a logic 0 level so pulses appearing at terminal A of AND gate 194 from the output of AND gate 190 will be blocked. The logic 0 signal at line 178 also appears at input A of NAND gate 202 so input A of AND gate 200 is at a logic 1 level and enabled to pass pulses at its B input to reel width counter 174. As a result of the logic 0 at input B of gate 204, from line 178, gate 204 is disabled and dwell counter 180 cannot count at this time.

With the various dividers and counter in their reset or cleared states, and reel 8 in an initial or start position, the winding drive motor 16 is energized to start winding the tubing onto the reel. Pulses from pulse generator 34 appear on input line 41 of divider 170 and the output pulses appear at terminal A of AND gate 190. Since AND gate 190 is enabled as a result of the logic 1 at its input B, the pulses pass to terminal B of AND gate 192 which is enabled as a result of the logic 1 level of its input A from flip flop 210. Correspondingly, the pulses pass through gate 192 to forward output line 42 and step stepping motor 56 in its forward direction. This causes reel 8 to traverse in the forward direction of arrow 104, as previously explained. Since terminal B of AND gate 194 is at logic 0 level there is no output to reverse line 43.

Pulses on line 188 also appear at the input of reel width counter 174 because of the logic 1 level of input A of gate 200 which enables this gate. These pulses are counted by the reel width counter and when the count in the reel width counter 174 reaches the programmed count, the logic level of output line 178 changes from 0 to 1, and a dwell interval commences. As a result the logic level of input A of NAND gate 202 becomes 1 and its output logic level becomes 0 so AND gate 200 is disabled and cuts off pulses to the reel width counter. With input B of NAND gate 206 now at a logic 1 level, the output of the NAND gate 206 and the input B of AND gate 190 is at logic 0 so AND gate 190 is disabled and no pulses appear at its output. (Disabling AND gate 190 eliminates the pulses from both lines 42 and 43 during the dwell interval). With a logic 1 on line 178 AND gate 204 is enabled because of the logic 1 at its input terminal B and correspondingly, pulses at output line 188 appearing at input A of AND gate 204 pass to dwell counter 180.

During this dwell, no pulses appear at either lines 42 or 43, but the reel continues to rotate about one additional revolution to apply the first wrap of the next outer layer of tubing which is wound on the reel. When the count in dwell counter 180 reaches the preset number, which occurs when the reel has made about one additional revoltuion, a pulse appears at output terminal 184 of dwell counter 180. The pulse resets dwell counter 180 and also resets reel width counter 174 via the line 217 connecting output terminal 184 to reset terminal 216 of the reel width counter. Resetting reel width counter 174 switches the signal on output line 178 from logic 1 back to logic 0. With the signal on line 178 at logic 0, AND gate 200 is enabled, AND gate 190 is enabled, but AND gate 204 is disabled. As a result of switching the logic level of line 178 from 0 to 1 and back to 0, flip flop 210 changes state so its output 212 is at logic 0 and output line 214 is at logic 1. This causes AND gate 192 to be disabled so no pulses appear on line 42, but enables AND gate 194 and positive pulses then appearing at the input of inverting amplifier 196 are inverted to provide the negative pulses which appear on reverse output line 43 of the preset counter and divider 40. These pulses on line 43 step stepping motor 56 in a reverse direction thereby causing cylinder 25 to traverse reel 8 in the reverse direction of arrow 106.

When the reel again reaches the end of its traverse as indicated by completion of the count in reel width counter 174, the signal on output line 178 again switches from 0 to 1, gate 190 is disabled and no pulses appear on output lines 42 and 43, gate 200 is disabled so pulses to reel width counter 174 are blocked, and gate 204 is enabled so dwell counter 180 again counts the pulses for the dwell iinterval. Completion of count in dwell counter 180 resets the dwell counter and reel width counter 174 and causes the logic level on line 178 to again switch from 1 to 0, causes flip flop 210 to switch so a logic 1 signal appears at input A of AND gate 192 and enables gate 192 to pass pulses to forward output line 42 for the next forward traverse in the direction of arrow 104. This sequence of operations continues until length control 108 (or the operator) operates motor control 110 to stop drive motor 26 indicating that the required length of tubing is wound on the reel and that the wound coil is ready for removal.

As shown at FIG. 2, reset switch 102 is connected to clear terminal 218 of divider 170 to clear or reset the divider. Reset switch 102 is also connected to clear terminal 220 of flip flop 210 by wire 221, clear terminal 216 of reel width counter 174, and clear terminal 186 of dwell counter 180. A blocking diode 222 prevents the reset pulse appearing at terminal 184 of dwell counter 180 from clearing flip flop 210 and divider 170.

If desired, line 198 can be connected to input line 41 rather than output line 188 of divider 170 and line 205 can also be connected to input line 41 rather than output line 188 of the divider. Of course, the reel width counter 174 and dwell counter 180 will be programmed differently when these latter connections are made.

OPERATION

After the diameter of the tubing to be wound is known, the axial width of the coil to be wound is determined, and the number of feet of tubing to be wound on the coil is known, divider 170, reel width counter 174, and dwell counter 180 are programmed. As previously explained, the number by which divider 170 divides pulses from line 41 is indicative of the diameter of the tubing to be wound and is so selected that after the division, the number of pulses appearing on either output line 42 or output line 43 is that number required to cause the system to traverse the reel a distance precisely equal to the diameter of the tubing plus a small space during each revolution of the reel, and for each fractional increment of rotation of the reel which produces a pulse, the reel will be traversed the same fractional increment of the tubing diameter. The number of pulses at output line 188 of divider 170 should be at least 10 pulses per revolution of the reel and preferably more to assure that the traverse closely tracks the rotation of the reel. By using a large number (such as 1000) pulses per revolution and a 2-digit frequency divider, a fine resolution of possible tubing spacing can be achieved. The count of reel width counter 174 is so selected that the axial length of the coil wound on the reel is precisely the required length when the count in reel width counter 174 is complete. Dwell counter 180 is programmed so it will count that number of pulses appearing at output line 188 of the divider which represents one complete revolution of the reel (or a number near one) after the start of a dwell cycle. The various counts are determined semi-empirically since they depend on numerous different parameters of the system. With the various counts of preset counter and divider 40 preset, the winding apparatus is ready for operation.

In operation, reel 8 is first traversed to its full inward position, i.e., the maximum extent of its travel in the direction of arrow 106. The reel is then turned to a predetermined angular start position and the end of tubing 10 from guide rools 13 is secured to the reel. Length control 108 is reset, and reset button 102 is pressed or else relay contact 102A is closed to reset the various circuit components of preset counter and divider 40 to a start position. In this start position, synchro-transmitter 30 is in a precise rotational position relative to the rotational position of synchro-transformer 58.

The start control of motor control 110 is then actuated to energize motor 16 and rotate reel 8. The first few degrees of rotation of reel 8 cause pulses from pulse generator 34 to appear on forward output line 52 to step stepping motor 56 via the path including line 41, preset counter and divider 40, forward output line 42, contact network 44, and translator 48. Stepping motor 56 rotates synchro-transformer 58 through gearbox 57 so it leads the synchro-transmitter 30 with the result that the direction of the phase shift signal which appears on lines 62 and 64 causes demodulator 66 to generate a negative error signal on its output line 68. This error signal from output line 68 appears at terminal 70, and causes servo-amplifier 72 to energize servo-valve 92 so the valve opens in a direction to admit hydraulic fluid under pressure to the cylinder 25 through line 100. This causes reel 8 to traverse in the direction of arrow 104. As reel 8 traverses, synchro-transformer 58 rotates, because of its mechanical connection to rack 27 via pinion 28. The operation of the system is such that when motor 16 is at operating speed, reel 8 is traversed at a rate which maintains synchro-transmitter 30 and synchro-transformer 58 is rotational synchronism, and the error signal is zero.

So long as synchro-transmitter 30 and synchro-transformer 58 are in positional synchronism, no error signal appears at input terminal 70 of servo-amplifier 72 and the position of servo-valve 92 remains unchanged so the flow of fluid through line 100 into cylinder 25 is constant. As the rotational position of synchro-transformer 58 leads or lags the rotational position of synchro-transmitter 30, error signals appearing on demodulator output line 68 operate servo-amplifier 72 to shift the position of servo-valve 92 so the traverse tracks the rotation of the reel.

When the count in the reel width counter 174 of preset counter and divider 40 reaches its preset number, pulses to both output lines 42 and 43 are discontinued, the reel continues to rotate about one revolution as determined by dwell counter 180, but the traverse remains motionless during this dwell because no pulses are received by stepping motor 56. At completion of the count in dwell counter 180, pulses appear at reverse output line 43 from preset counter and divider 40. The pulses on reverse output line 43 cause stepping motor 56 to step in a reverse direction thereby causing synchro-transformer 58 to lead synchro-transmitter 30 and a phase shift signal is generated which causes a positive error signal to appear on output line 68 of demodulator 66. This positive error signal causes output current from servo-amplifier 72 to increase in a negative direction on line 88 with respect to line 90 so servo-valve 92 opens in a direction to admit pressure fluid to cylinder 25 via line 98 thereby traversing the reel in the reverse direction of arrow 106. Traverse, winding, and dwell continue until length control 108 or the operator determines that the reel is full. Length control 108 then decelerates the motor through control 110 and lights indicator lamp 112 to indicate that the wound coil contains the desired footage of tubing.

The operator then presses button 144 or an automatic control closes switch 164 to traverse the reel to its outer-most position in the direction of arrow 104. Since such traverse is accomplished by using pulses from oscillator 116, synchronism of the synchro-transmitter 30 and synchro-transformer 58 is maintained.

With the reel in its outermost position, the wound coil of tubing is strapped or otherwise secured, the end 31 of the reel is removed, and the coil is then removed from the reel. End 31 is then replaced, manual traverse button 146 is depressed, or relay contact 166 closed, and the reel returns to its start position. After rotating reel 8 to its angular start position and connecting the cut end of tubing 10 to the reel, reset button 102 is depressed, (or relay contact 102A closed) motor control 110 is started, and another coil is wound.

To change over from winding tubing of one diameter to another diameter of for example, a larger size, the division factor of divider 170 is reduced to a lower predetermined number by manually operating preset 171. Preset 182 is then reprogrammed so the count in counter 180 will be complete upon receiving pulses from divider 170 indicative of one complete revolution (or the desired fractional turn near one) of the reel to provide the dwell interval. To change the width of the coil wound by the level wind system, it is merely necessary to change the preset count in reel width counter 174. Regardless of the diameter of the tubing wound, precise level winding is obtained.

The system of this invention provides optimum steady-state and dynamic accuracy without instability or oscillation. Optimum steady-state accuracy is attributed to the use of operational amplifier 72 which operates in an integrating mode, and the notch filter which removes high frequency components from the output signal from the demodulator 66.

Dynamic accuracy of the system under changing conditions such as changing reel rotational speed and at the beginning and end of each traverse is attributable in part to the high gain of servo-amplifier 72 and the close mechanical tracking characteristics of this system. Optimum results are obtained in the hydraulic system by virtue of the following:

1. Servo-valve 92 is placed closely adjacent to cylinder 25 so that the distance between the servo-valve and the ports of the cylinder is maintained at a minimum;
2. The areas of the working faces of piston 25' are relatively large, within practical limit;
3. The mass of the reel 8 and its associated traversing support parts is maintained at a minimum.

These factors provide the hydraulic system with a relatively high resonant frequency so that the hydraulic system has a relatively high gain. An additional contributing factor to good dynamic accuracy is the lead network which permits higher gain settings of servo-amplifier 72 without incuring system instability, such as oscillation.

The accuracy of the system can be quite good in that a very high quality coil is expected where one-half inch diameter tubing is to be wound on a 24 inch diameter reel at a line speed of 5000 feet per minute. At this line speed, a traverse speed of 6.6 inches per second is required, and good results should be obtained.

While a preferred embodiment of a level wind arrangement in accordance with this invention has been shown and described in detail, it is to be understood that numerous changes can be made without departing from the scope of this invention as set forth herein and defined in the appended claims.

We claim:
1. A level wind arrangement for accurately level winding material of a substantially uniform transverse dimension comprising, in combination
reel means;
drive means for rotating the reel means with a torque sufficient to wind the material on the reel means;
traverse means for traversing one of the material and reel means with respect to the other, and comprising
a double acting, double rod hydraulic cylinder having a piston with two working faces, said faces having equal areas so that the traverse characteristics of the cylinder are the same in both a forward and a reverse direction;
pulse deriving means for deriving a pulse in response to each predetermined increment of rotation of the reel means from a start position so that rotating the reel means produces a first plurality of pulses;
means for dividing said pulses from said pulse deriving means by a quantity indicative of the transverse dimension of the material wound on the reel means to produce a second plurality of pulses;

means responsive to said second plurality of pulses for deriving a reel rotation signal indicative of the rotational position of the reel means, and comprising a synchro transmitter having an input shaft, motor means having a shaft driven a predetermined increment in response to each of said second plurality of pulses, and transmission means connected between said motor shaft and synchro transmitter input shaft for rotating said input shaft an amount proportional to but different from the rotation of the motor shaft;

a synchro transformer having an input shaft;

means for driving said synchro transformer input shaft in response to traverse;

means connecting said synchro transmitter to said synchro transformer to derive an error signal in response to non-synchronism of the transmitter and transformer;

control means responsive to the error signal for controlling the traverse means to correct the traverse position of the reel means with respect to its rotational position, so that the transformer and transmitter move toward rotational synchronism to reduce the error signal, said means comprising, servo-valve means colsely adjacent said hydraulic cylinder for controlling the flow of hydraulic fluid to said cylinder;

counter means for counting one of said series of pulses and comprising means for discontinuing said second plurality of pulses to said motor means in response to the attainment of a predetermined first count, so that traverse in one direction ceases while the reel means continues to rotate; and means responsive to a predetermined second count for again supplying said second pulses to the motor means, so that traverse commences in an opposite direction.

2. A level wind arrangement according to claim 1 wherein said control means further includes electronic circuit means comprising servo-amplifier means for operating said servo-valve means, notch filter means connected to said servo-valve means for eliminating high frequency components from said error signal, and lead network means connected to said servo-amplifier means for improving dynamic performance of the system.

3. A level wind apparatus according to claim 1 wherein said traverse means traverses the reel means with respect to the material to be wound;

the reel means includes a drive shaft projecting axially from the reel means;

means supporting said reel drive shaft for axial movement to traverse the reel means; and said drive means includes a fixed drive motor, and torque transmitting means connecting said motor to said reel drive shaft throughout the extent of axial movement of the drive shaft.

4. A level wind arrangement according to claim 1 wherein said counter means includes preset means for presetting said predetermined first count so that the width of a coil wound by the level wind arrangement can be readily changed.

5. A level wind arrangement according to claim 4 wherein said counter further includes preset means for presetting said predetermined second count to a selected number so that the extent of rotation of the reel means prior to traverse in said opposite direction can be readily changed.

6. A level wind arrangement according to claim 5 wherein said means for dividing said pulse comprises an electronic divider; and said divider includes preset means for presetting the number by which the pulses are divided so that the traverse per revolution of the reel means can be readily changed.

* * * * *